Dec. 16, 1952                J. F. BOYLE              2,621,874
AIRBORNE VEHICLE AND CUSHIONING AND/OR
BUOYANCY SUPPORTING MEANS THEREFOR
Filed April 17, 1950                                        4 Sheets-Sheet 2
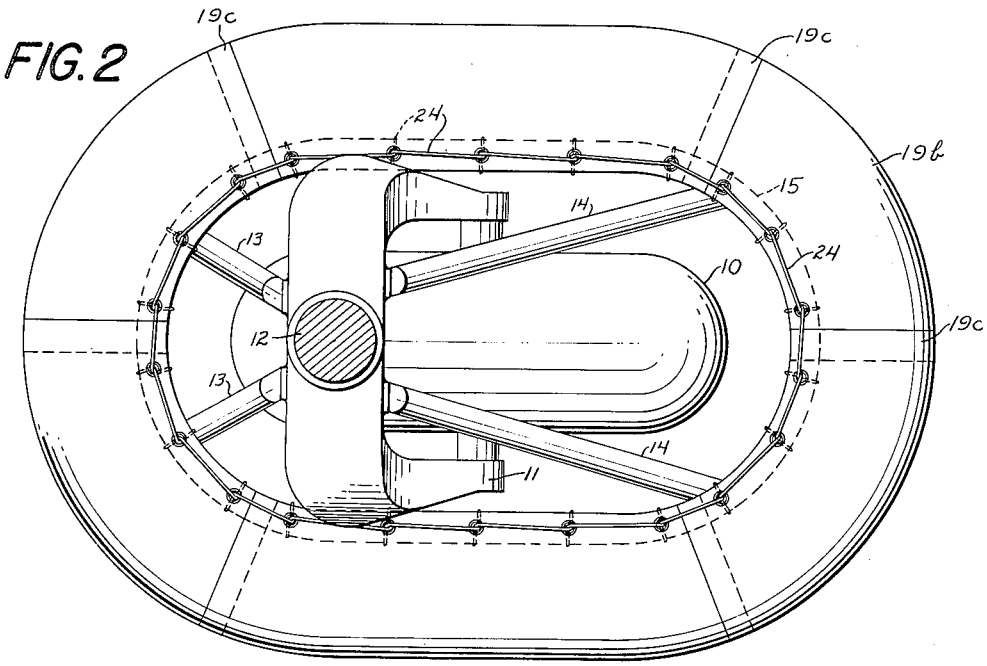
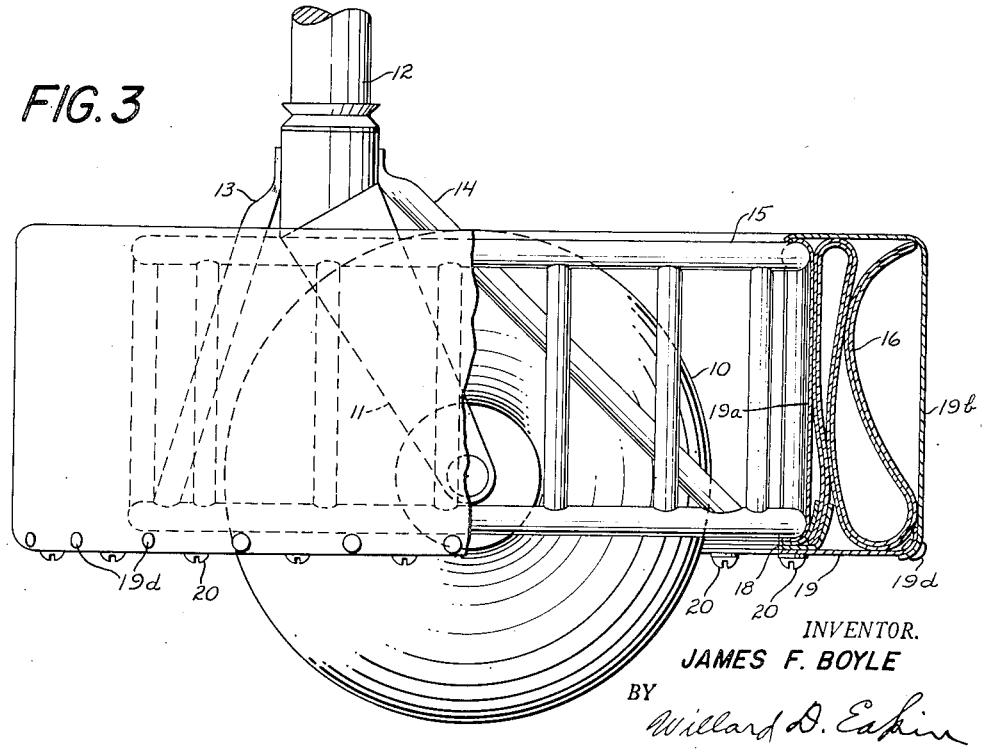
INVENTOR.
JAMES F. BOYLE
BY
Willard D. Eakin
ATTORNEY Dec. 16, 1952 J. F. BOYLE 2,621,874
AIRBORNE VEHICLE AND CUSHIONING AND/OR
BUOYANCY SUPPORTING MEANS THEREFOR
Filed April 17, 1950 4 Sheets-Sheet 3

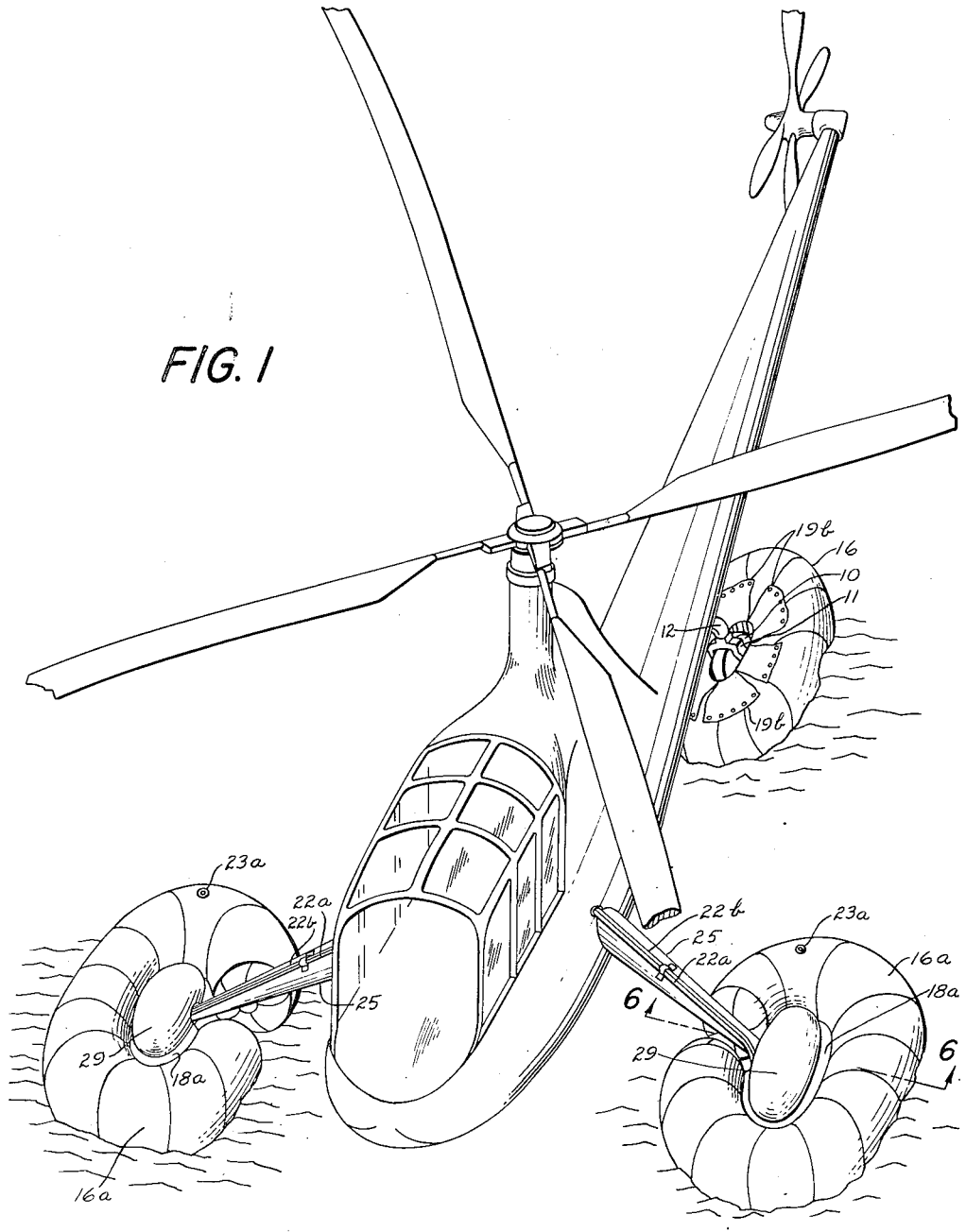

INVENTOR.
JAMES F. BOYLE
BY Willard D. Eakin
ATTORNEY

Dec. 16, 1952  J. F. BOYLE  2,621,874
AIRBORNE VEHICLE AND CUSHIONING AND/OR
BUOYANCY SUPPORTING MEANS THEREFOR
Filed April 17, 1950  4 Sheets-Sheet 4
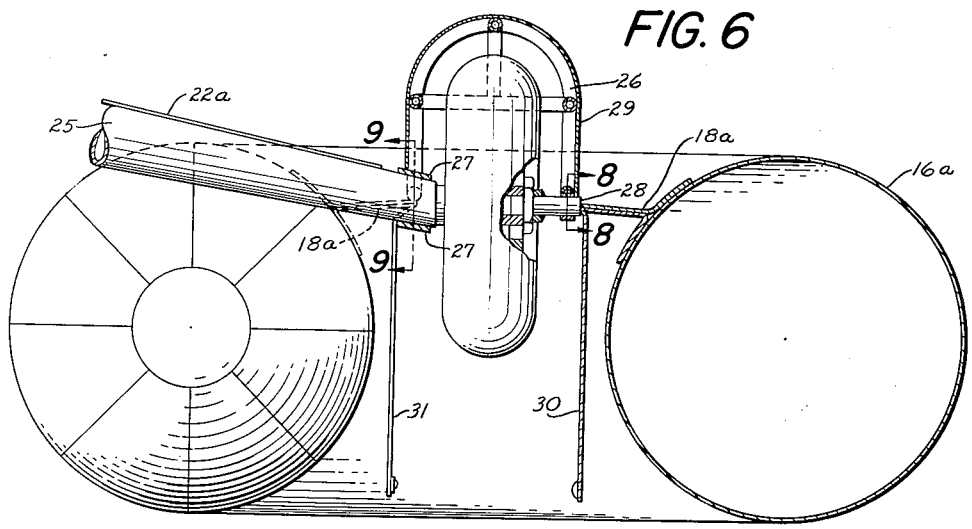
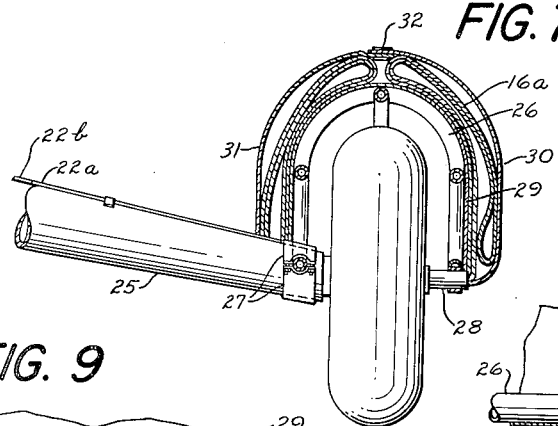
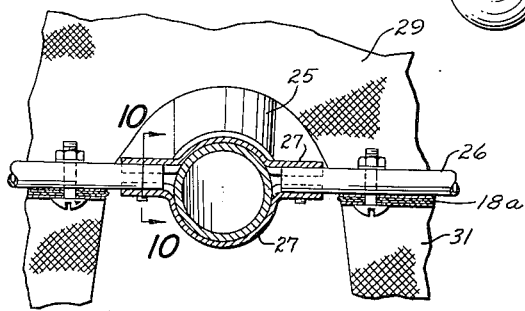
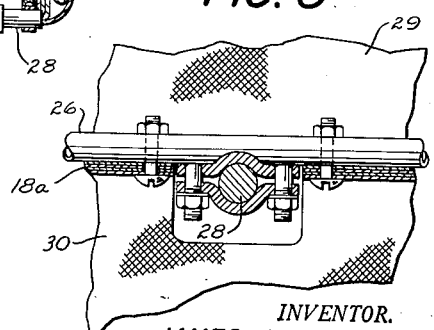
INVENTOR.
JAMES F. BOYLE
BY
Willard D. Eakin
ATTORNEY Patented Dec. 16, 1952

2,621,874

UNITED STATES PATENT OFFICE 2,621,874

AIRBORNE VEHICLE AND CUSHIONING AND/OR BUOYANCY SUPPORTING MEANS THEREFOR

James F. Boyle, Teaneck, N. J., assignor to Air Cruisers Company, a corporation of New Jersey Application April 17, 1950, Serial No. 156,392

12 Claims. (Cl. 244—101)

1

This invention relates to airborne vehicles such, for example, as amphibious helicopters and to devices adapted to support the vehicle by their buoyancy in the case of "landing" upon water, and/or to cushion the vehicle in the case of its being decelerated or wholly or partially supported by land.

Its chief objects are to provide inflatable means so positioned and of such character as to support the vehicle, on water, with at least the greater part of the vehicle out of the water; thus to provide against damage to parts, such as magnesium parts, that are subject to serious damage from immersion in water; to provide buoyancy supporting means so positioned and of such character as to perform the supporting function without requiring extensive change of structure, such as modification or removal of the wheels or the oleo cushioning device or devices of the vehicle; to provide improved supporting means adapted to permit the vehicle to take off again after a landing, on either water or land; to provide cushioning and/or buoyancy supporting means adapted to perform its function without modifying the "balance" of the assembly, by having its center of buoyancy (or center of ground pressure) under the center of gravity of the assembly without requiring the vehicle to tilt substantially from normal position for vertical alignment of the two centers in the transfer of the weight from airborne support to land or water support; to provide an assembly well adapted for landing and take-off on tundra, marshes and the like, as well as water and firm land; to provide supporting means having low drag when folded and stored; and to provide improved means for confining and protecting inflatable members when they are folded and stored.

Of the accompanying drawings:

Fig. 1 is a perspective view of an amphibious helicopter embodying my invention in its preferred form, with buoyancy members inflated.

Fig. 2 is a top plan view of the tail-wheel assembly of the same, with the inflatable member in deflated, folded and stored condition.

Fig. 3 is a side elevation, partly in section, of the assembly shown in Fig. 2.

Fig. 6 is a front elevation, with parts in section, of the assembly shown in Fig. 5, but on a

2 larger scale with the buoyancy member inflated.

Figure 5:
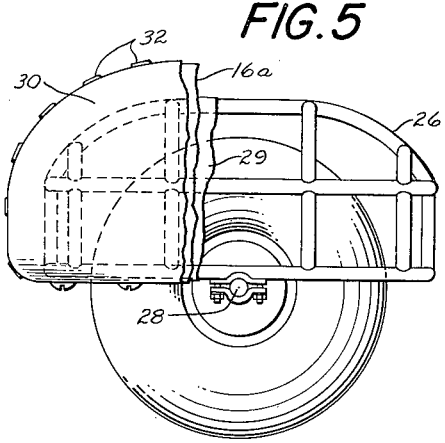
Fig. 5 is a side elevation, with parts broken away, of one of the main-wheel assemblies with the buoyancy member in deflated, folded and stored condition.

Fig. 7 is a vertical section of the same, with parts in elevation, on the same scale as Fig. 5, and with the buoyancy member in deflated, folded and stored condition.

Fig. 8 is a section on line 8—8 of Fig. 6.

Fig. 9 is a section on line 9—9 of Fig. 6.

Figure 10:
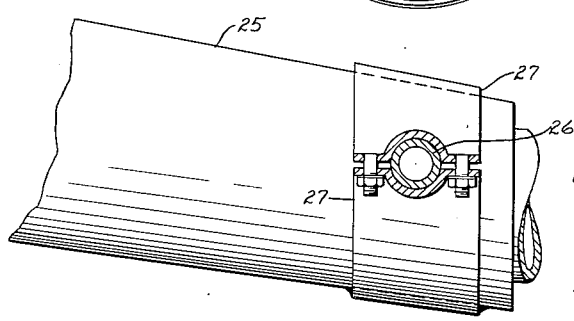

Fig. 10 is a section on line 10—10 of Fig. 9.

I attain the above stated objects primarily by providing buoyancy and/or cushioning means and mountings for them, individual to the several wheels, such that they extend about the respective wheels, with their respective centers of support approximately in vertical alignment with the normal centers of support of the respective wheels, but preferably a substantial distance below the latter, and with their respective load-supporting capacities, when the vehicle is in normal attitude, substantially equal respectively to the loads normally supported by the respective wheels.

Referring first to the tail-wheel assembly, shown in Figs. 1 to 4, the tail-wheel, 10, is here shown as being mounted in the usual bearing-fork 11 having a stem 12 which can be part of a standard cushioning device.

Secured to the fork 11, as by welded struts 13, 13, 14, 14, is an oblong endless frame 15, preferably formed of welded tubing, which extends about the wheel with its lower annular margin in a low position in relation to the wheel. The struts 13, 14 preferably have their connection to the frame at that lower margin because it is at that margin that the buoyancy member preferably has its connection to the frame.

The buoyancy member 16 is an oblong, annular inflatable bag, of circular cross-section, surrounding the frame and preferably formed of suitably shaped pieces of rubberized fabric suitably seamed to one another, the bag of course being impervious to air and water.

Figure 4:
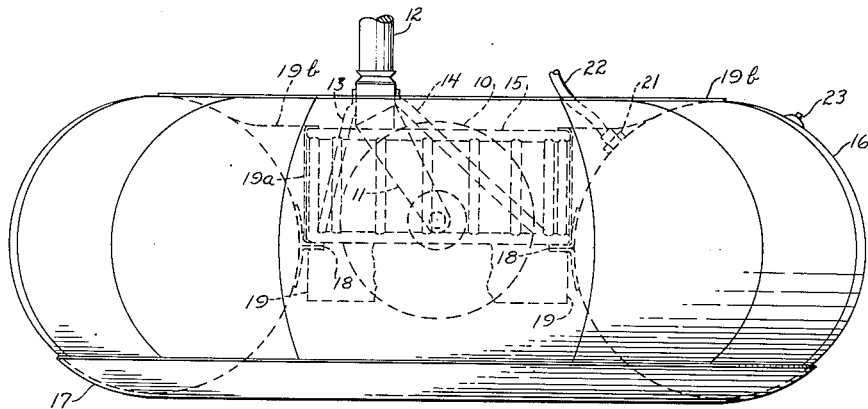
Fig. 4 is a side elevation, of the same with the buoyancy member inflated.

The part of the bag that is to contact the ground or be lowermost in water can be provided with an additional protective layer of rubberized fabric, 17, Fig. 4, on its external face.

The bag 16 is provided, preferably along the middle line of its inner periphery, with a fabric attachment flange 18 which, along with the inner margin of a rubberized fabric, annular, lower, storage-cover member 19, and the lower margin of an inner cover 19a, is secured to the lower margin of the frame by screws 20, 20.

Fig. 4, showing the inflated bag as being perfectly symmetrical with relation to its attachment flange 18, may be considered as representing the bag as being under zero positive or negative load, but it also is approximately representative of the bag in fully loaded condition in water, because when the bag is inflated it has high stability of shape under load as a float, in the same way that an inflated pneumatic tire has very strong resistance to relative lateral movement of its tread portion. The air pressure holding the bag to circular cross-section and strongly resisting change of length of the middle zone of its inner periphery and of the middle zone of its outer periphery, the bag has a strong resistance to rolling on a curved (in this case endless) axis, and, being of suitable size, can support its entire load without rising excessively in relation to its attachment flange 18, frame 15 and wheel 10. Thus the vehicle itself is held high in relation to the surface of the water. The bag is shown (Fig. 4) as being provided with a check valve 21 and inflating tube 22 for inflating it from the cabin or fuselage, during flight, and with a mattress-type valve 23 for deflating it for folding and storage.

Upon deflation it is folded and stored as shown clearly in Fig. 3 (see also Fig. 2) and is enclosed by the lower cover member 19 and inner cover 19a above referred to and a main cover 19b, of rubberized fabric, which is secured at its inner margin, along with the upper margin of the inner cover 19a, to the upper annular member of the frame, by a cord lacing 24, Fig. 2, extending through "grommets" (eyelets) in the fabric members.

The outer cover 19b can, and preferably does, consist of a plurality of individual sections, as shown clearly in Fig. 1, of which a radial margin of each one overlaps a radial margin of the next, as at 19c, 19c in Fig. 2, when the cover is in place upon the deflated and folded bag.

The outer cover 19b and the lower cover 19 are provided at their outer margins with mating snap-fasteners, one of which is shown at 19d in Fig. 3, for holding the covers in closed condition, and these fasteners are adapted to be automatically disengaged by inflation of the bag, the covers then drifting free, as shown in dotted lines in Fig. 4, until the bag is again deflated, folded and stored, these operations of course being performed by hand.

The front-wheel assemblies (Figs. 1 and 5 to 10) correspond, in structure, mode of operation and manner of manipulation, to the tail-wheel assembly above described except as follows, reference being had to the assembly at the right (the pilot's left) in Fig. 1:

Instead of being endless, the bag, 16a, is interrupted at the position of the cantilever wheelleg, arm or strut, 25, to accommodate the latter with the bag at a desirable relative elevation, and to permit the bag to be swung upward, in deflated condition, for storage, so that modification of the standard wheel mounting or of cushioning means associated with it is not required.

The bag 16a of the front wheel assembly, when used with a cantilever type wheel mounting, is thus of C shape, but, nevertheless, its center of buoyancy, or of ground pressure, is at or substantially at the wheel's normal center of ground pressure, according to the determinate lateral positioning of the bag and/or according to whether it is of uniform or graduated crosssectional size.

The end-walls of the bag at the gap, of the C, are of course of hemispherical shape, as shown, for effective and non-buckling sustension of the inflation pressure.

For storage of the C-shaped bag, an oblong welded-tube frame 26 is secured at one side by a clamp 27 to the strut 25 and at the other side is provided with a shouldered stud 28 the inner end of which is mounted telescopically in a central bore in the wheel's spindle before the securing of the clamp 27.

The frame is provided with a rubberized fabric, covering 29 to underlie the folded bag for its protection, and rubberized fabric cover members 30, 31, with snap fasteners such as the one shown at 32, Fig. 7, are provided for completing the enclosure of the folded bag.

In folding the C-shaped bag of this embodiment for storage over the wheel the bag is folded and pleated both laterally and longitudinally, in "piece-of-pie" fashion, and thus can be brought into quite compact condition.

In this front-wheel embodiment, because, as in the tail-wheel embodiment, the bag when inflated is to have a low position in relation to the wheel but when deflated and stored is to have a higher position in relation to the wheel, the bag's attachment flange, 18a, is at a position substantially above the middle line of the inner periphery of the bag, and is of corresponding radial dimension.

However, in this case, as in the case of the tail-wheel assembly, and even though the bag is C-shaped instead of endless, the inflation pressure, with the bag curved about the front and the rear of the wheel, resists adequately its force of buoyancy urging it to rise in relation to the wheel. As a factor in this matter it is worthy of note that the hammock-like pull of the attachment flange 18a is at a C-shaped line in the bag which is of substantially greater "diameter," or at least radius of curvature, than the middle line of the inner periphery of the bag, so that the pull is strongly resisted, as soon as it begins, by the refusal of the bag either to be drawn to a smaller C-size or to roll on a curved axis.

When the vehicle lands upon tundra or upon marshy or otherwise soft ground the characteristics just referred to give the bag a "snow-shoe" effect which is of course highly desirable, the soft ground material being pocketed in the curvature of the bag. Even on solid ground the longitudinally curved shape of the bag gives it a greater area of ground contact for a given degree of flattening of the bottom of the bag than would be had if the bag were spherical or were curved about a horizontal axis, as a tire is, and thus the bag longitudinally curved as viewed from above develops the necessary resistance for supporting the load without excessive flattening of the bag.

In the front-wheel embodiment two inflating tubes, 22a and 22b, are shown as leading from the body of the helicopter to the bag, as would be required for a bag of the bulk-head type.

A deflating valve or valves, as shown at 23a, 23a, Fig. 1, preferably are provided for the Cshaped bag.

For brevity the bags shown in the drawings are referred to as being curved although they in fact consist of a series of segments which individually are straight or virtually straight but are so shaped and joined that they give the general effect of curvature. In the appended claims likewise the word "curved" is used for brevity but is intended to be inclusive of any bag which as viewed from above is of laterally digressing shape, as in the case of straight sections assembled in C, U, L or S form, for example.

Further adaptations and modifications are possible without sacrifice of all of the advantages set out in the above statement of objects and without departure from the scope of the invention as defined by the appended claims. For example, although the invention has been described herein as applied to a helicopter, and to a vehicle having three wheels, with one of them a tail wheel, the invention is of course not limited to that particular wheel arrangement nor to the helicopter type of vehicle.

I claim:

1. Auxiliary supporting means for an airborne vehicle having a body, a body-supporting ground contacting member and a supporting structure connecting the two for supporting said body from said member, said auxiliary supporting means comprising an elongated, fluid-distensible bag having curved form, as a whole, for extending about the vertical center line of the said ground-contacting member, in radially spaced relation thereto, and means for supporting the said structure from the said bag, said bag being of C shape, as viewed from above, the gap of the C being adapted to accommodate said supporting structure.

2. Auxiliary supporting means for an airborne vehicle having a body, a body-supporting ground contacting member and a supporting structure connecting the two for supporting said body from said member, said auxiliary supporting means comprising an elongated, fluid-distensible bag having curved form, as a whole, for extending about the vertical center line of the said ground-contacting member, in radially spaced relation thereto, and means for supporting the said structure from the said bag, said bag being of C shape, as viewed from above, the gap of the C being adapted to accommodate said supporting arm, said auxiliary supporting means including tension means extending inwardly from the bag for supporting said structure from said bag.

3. Auxiliary supporting means for an airborne vehicle having a body, a body-supporting ground contacting member and a supporting structure connecting the two for supporting said body from said member, said auxiliary supporting means comprising an elongated, fluid-distensible bag having curved form, as a whole, for extending about the vertical center line of the said ground-contacting member, in radially spaced relation thereto, and means connected to said bag substantially above the horizontal middle plane of the bag for supporting said body from said bag through said structure.

4. Auxiliary supporting means for an airborne vehicle having a body, a body-supporting ground contacting member and a supporting structure connecting the two for supporting said body from said member, said auxiliary supporting means comprising an elongated, fluid-distensible bag having curved form, as a whole, for extending about the vertical center line of the said ground-contacting member, in radially spaced relation thereto, and means connected to said bag substantially above the horizontal middle plane of the bag for supporting said body from said bag through said structure, the last said means comprising flexible sheet material for sustaining weight of said body in the manner of a hammock.

5. Auxiliary supporting means for an airborne vehicle having a body, a body-supporting ground contacting member and a supporting structure connecting the two for supporting said body from said member, said auxiliary supporting means comprising an elongated, fluid-distensible bag having curved form, as a whole, for extending about the vertical center line of the said ground-contacting member, in radially spaced relation thereto, and means for supporting the said structure from the said bag, said auxiliary supporting means including means for housing the bag and holding it in deflated and collapsed condition.

6. Auxiliary supporting means for an airborne vehicle having a body, a body-supporting ground contacting member and a supporting structure connecting the two for supporting said body from said member, said auxiliary supporting means comprising an elongated, fluid-distensible bag having curved form, as a whole, for extending about the vertical center line of the said ground-contacting member, in radially spaced relation thereto, and means for supporting the said structure from the said bag, said auxiliary supporting means including means for housing the bag and holding it in deflated and collapsed condition, and the said housing means comprising a plurality of flexible flaps of sheet material and means, disengageable by distension of the bag, for holding said flaps in housing relation to the bag.

7. Auxiliary supporting means for an airborne vehicle having a body, a body-supporting ground contacting member and a supporting structure connecting the two for supporting said body from said member, said auxiliary supporting means comprising an elongated, fluid-distensible bag having curved form, as a whole, for extending about the vertical center line of the said ground-contacting member, in radially spaced relation thereto, and means for supporting the said structure from the said bag, said auxiliary supporting means including means for housing the bag and holding it in deflated and collapsed condition, and the said housing means comprising a rigid support for the collapsed bag and flexible housing members secured to said rigid support for holding the bag in collapsed condition against the said support.

8. The combination of an aircraft wheel, a journal mounting therefor, an elongated collapsible and fluid-distensible bag of longitudinally curved form as a whole for extending about the vertical center-line of the wheel, means for securing said bag to said journal-mounting, and means secured to said journal mounting for housing the bag and holding it in deflated and collapsed condition.

9. The combination of an aircraft wheel, a journal mounting therefor, an elongated collapsible and fluid-distensible bag of longitudinally curved form as a whole for extending about the vertical center-line of the wheel, means for securing said bag to said journal-mounting, and means secured to said journal mounting for housing the bag and holding it in deflated and collapsed condition, the said housing means comprising a rigid support facing outwardly from the relative position of the wheel and extending along the curved bag for collapsing of the bag inwardly, toward the relative position of the vertical center-line of the wheel, against said rigid support, and flexible flaps of sheet material secured to said rigid support for holding the bag collapsed against the said support.

10. The combination of an aircraft wheel, a journal mounting therefor, an elongated collapsible and fluid-distensible bag of longitudinally curved form as a whole for extending about the vertical center-line of the wheel, means for securing said bag to said journal-mounting, and means secured to said journal mounting for housing the bag and holding it in deflated and collapsed condition, the said housing means comprising a rigid support arched over the relative position of the wheel and flexible flaps of sheet material secured to said rigid support for holding the bag collapsed against the said support.

11. Auxiliary supporting means as defined in claim 3 in which the bag is of C shape as viewed from above.

12. Auxiliary supporting means as defined in claim 4 in which the bag is of C shape as viewed from above.

JAMES F. BOYLE.

REFERENCES CITED

The following references are of record in the file of this patent:

UNITED STATES PATENTS

| Number | Name | Date |
|---|---|---|
| 1,148,340 | Sloper | July 27, 1915 |
| 1,317,741 | Turnbull | Oct. 7, 1919 |
| 2,306,269 | King | Dec. 22, 1942 |
| 2,375,973 | Cooper | May 15, 1945 |
| 2,391,326 | McKinley | Dec. 18, 1945 |
| 2,396,212 | Spanel | Mar. 5, 1946 |
| 2,444,264 | Morris | June 29, 1948 |
| 2,507,913 | Lanser | May 16, 1950 |

OTHER REFERENCES

Flight Magazine, page 599, June 26, 1947.